(12) United States Patent
Yagihashi et al.

(10) Patent No.: US 12,240,104 B2
(45) Date of Patent: Mar. 4, 2025

(54) WRIST COVER, ROBOT, AND WRIST COVER SET

(71) Applicant: FANUC CORPORATION, Yamanashi (JP)

(72) Inventors: Ryou Yagihashi, Yamanashi (JP); Kouhei Hanatani, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/551,973

(22) PCT Filed: May 14, 2021

(86) PCT No.: PCT/JP2021/018351
§ 371 (c)(1),
(2) Date: Sep. 22, 2023

(87) PCT Pub. No.: WO2022/239223
PCT Pub. Date: Nov. 17, 2022

(65) Prior Publication Data
US 2024/0173876 A1    May 30, 2024

(51) Int. Cl.
*B25J 19/00*   (2006.01)
(52) U.S. Cl.
CPC ................................. *B25J 19/0075* (2013.01)
(58) Field of Classification Search
CPC ..................................................... B25J 19/0075
See application file for complete search history.

(56) References Cited

U.S. PATENT DOCUMENTS

| 2002/0144565 | A1* | 10/2002 | Ambrose | B25J 19/0025 |
| | | | | 74/490.03 |
| 2017/0072573 | A1* | 3/2017 | Motokado | B25J 17/0283 |
| 2018/0000472 | A1* | 1/2018 | Beira | B25J 19/0075 |

FOREIGN PATENT DOCUMENTS

| JP | S6263088 A | 3/1987 |
| JP | H0283192 A | 3/1990 |
| JP | H1133973 A | 2/1999 |
| JP | 2017056501 A | 3/2017 |

(Continued)

OTHER PUBLICATIONS

International Search Report and Written Opinion issued for priority International Application No. PCT/JP2021/018351, mailed Jul. 6, 2021. (English translation of Search Report only).

*Primary Examiner* — Joseph Brown
(74) *Attorney, Agent, or Firm* — Renner, Otto, Boisselle & Sklar, LLP (57) ABSTRACT

A wrist cover covers a wrist of a robot. The wrist includes a first wrist element, a second wrist element, and a third wrist element coupled in series and rotatable with respect to one another. The wrist cover includes: a rotating seal member that is fixed to the second wrist element, thereby sealing a ring-shaped gap between the second wrist element and the third wrist element while allowing relative rotation between the second wrist element and the third wrist element; and a flexible bag-shaped cover body that has a first opening arranged so that the first wrist element is passed therethrough, and a second opening arranged so that the third wrist element is passed therethrough. The cover body and the rotating seal member are attached with a space between a peripheral edge of the second opening and the rotating seal member being sealed over the entire periphery thereof.

7 Claims, 8 Drawing Sheets

(56) References Cited

FOREIGN PATENT DOCUMENTS

| JP | 2017132016 A | 8/2017 |
|---|---|---|
| JP | 2020006450 A | 1/2020 |
| WO | 2022163510 A1 | 8/2022 |

* cited by examiner

WRIST COVER, ROBOT, AND WRIST COVER SET

RELATED APPLICATION DATA

This application is a national phase of International Application No. PCT/JP2021/018351, filed May 14, 2021, which is hereby incorporated herein by reference in its entirety.

TECHNICAL FIELD

The present disclosure relates to a wrist cover, a robot, and a wrist cover set.

BACKGROUND ART

There is a known cover that covers a wrist of a robot (for example, see PTL 1).

This cover has a single cylindrical form that covers a first wrist element, a second wrist element that rotates with respect to the first wrist element, and a third wrist element that rotates with respect to the second wrist element. One end of the cover is attached to the first wrist element, and the other end of the cover is attached to the third wrist element.

The cover disclosed in PTL 1 has a bellows that allows the displacement of the second wrist element with respect to the first wrist element and the displacement of the third wrist element with respect to the second wrist element while covering the three wrist elements, thereby enabling large deformation.

Citation List

Patent Literature

PTL 1

Japanese Unexamined Patent Application, Publication No. 2017-56501

SUMMARY OF INVENTION

According to an aspect of the present disclosure, there is provided a wrist cover that covers a wrist of a robot, the wrist including a first wrist element, a second wrist element, and a third wrist element coupled in series so as to be rotatable with respect to one another, the wrist cover including: a first rotating seal member that is fixed to the second wrist element, thereby sealing a ring-shaped gap between the second wrist element and the third wrist element while allowing relative rotation between the second wrist element and the third wrist element; and a flexible bag-shaped cover body that has a first opening arranged in a state in which the first wrist element is passed therethrough, and a second opening arranged in a state in which the third wrist element is passed therethrough. The cover body and the first rotating seal member are attached with a space between a peripheral edge of the second opening and the first rotating seal member being sealed over an entire periphery thereof.

BRIEF DESCRIPTION OF DRAWINGS

{FIG. 1}

{FIG. 2}

{FIG. 3}

{FIG. 4}

{FIG. 5}

{FIG. 6}

{FIG. 7}

{FIG. 8}

DESCRIPTION OF EMBODIMENTS

A wrist cover 1 and a robot 10 according to one embodiment of the present disclosure will now be described with reference to the drawings.

Figure 1:
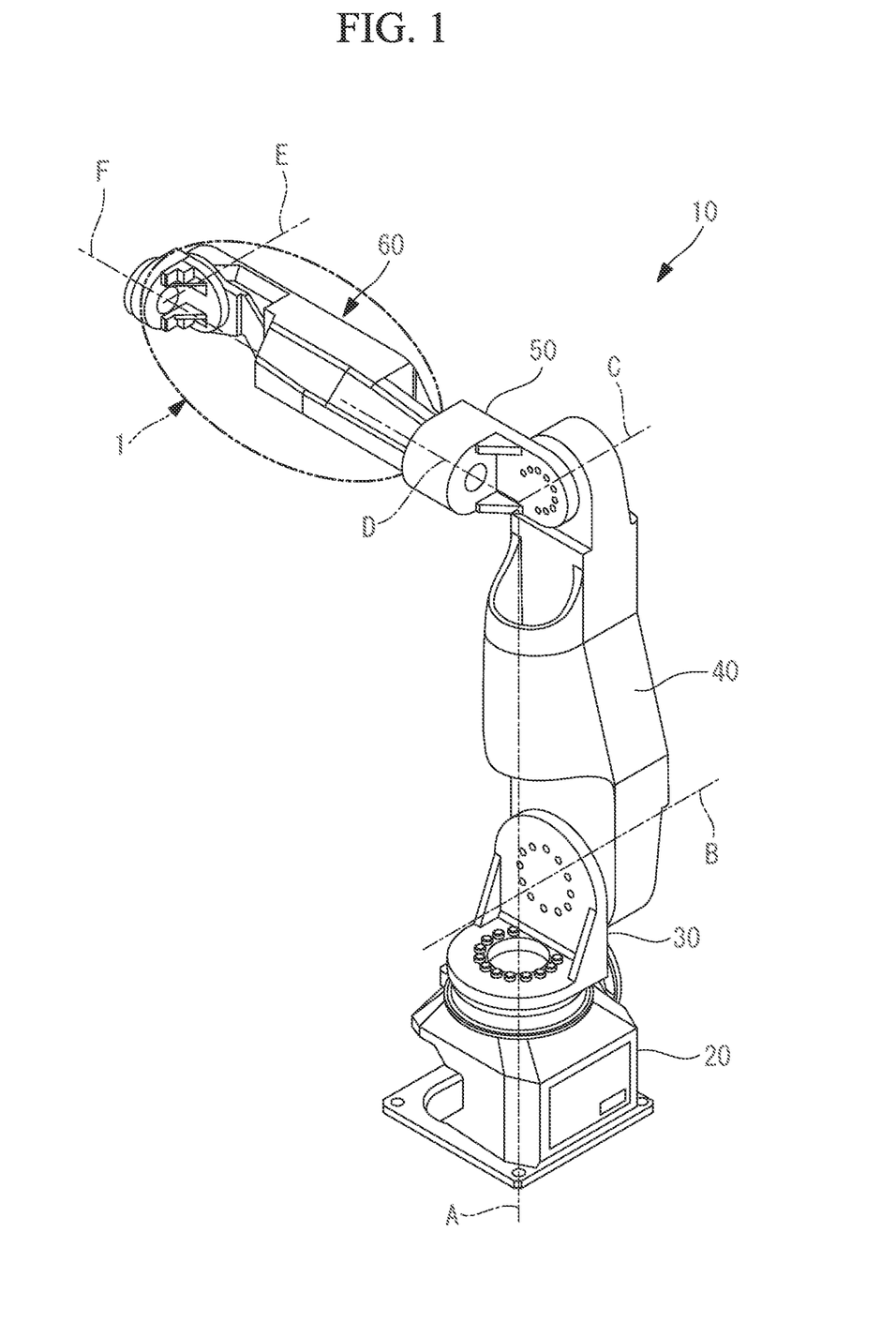
FIG. 1 is a perspective view illustrating the overall structure of a robot including a wrist cover according to one embodiment of the present disclosure.

The robot 10 according to this embodiment is, for example, as illustrated in FIG. 1, a 6-axis articulated robot.

The robot 10 includes a base 20 to be installed onto a horizontal floor, and a swing barrel 30 rotatably supported about a vertical J1 axis A with respect to the base 20. The robot 10 also includes a first arm 40 rotatably supported about a horizontal J2 axis B with respect to the swing barrel 30, and a second arm (arm) 50 rotatably supported about a horizontal J3 axis C with respect to the tip of the first arm 40. The robot 10 further includes a 3-axis wrist 60 supported by the tip of the second arm 50, and a wrist cover 1 attached to the wrist 60.

Figure 2:
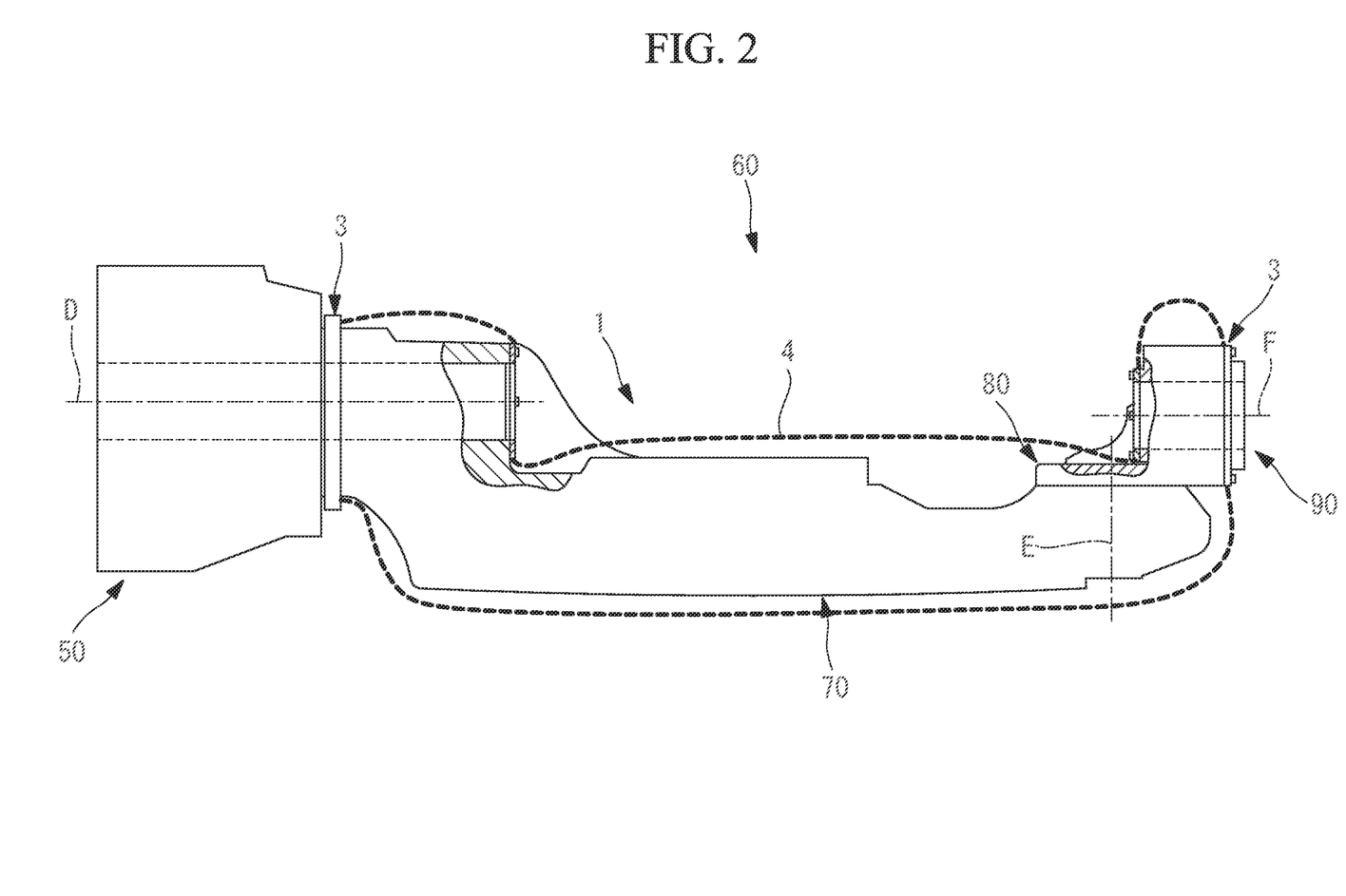
FIG. 2 is a longitudinal sectional view of a wrist of the robot illustrated in FIG. 1.

As illustrated in FIGS. 1 and 2, the wrist 60 includes a first wrist element 70 rotatably supported about a J4 axis (first axis) D, which extends along a plane orthogonal to the J3 axis C, with respect to the second arm 50. The wrist 60 includes a second wrist element 80 rotatably supported about a J5 axis E, which is orthogonal to the J4 axis D, with respect to the first wrist element 70, and a third wrist element 90 rotatably supported about a J6 axis (third axis) F, which is orthogonal to the J5 axis E, with respect to the second wrist element 80.

Figure 3:
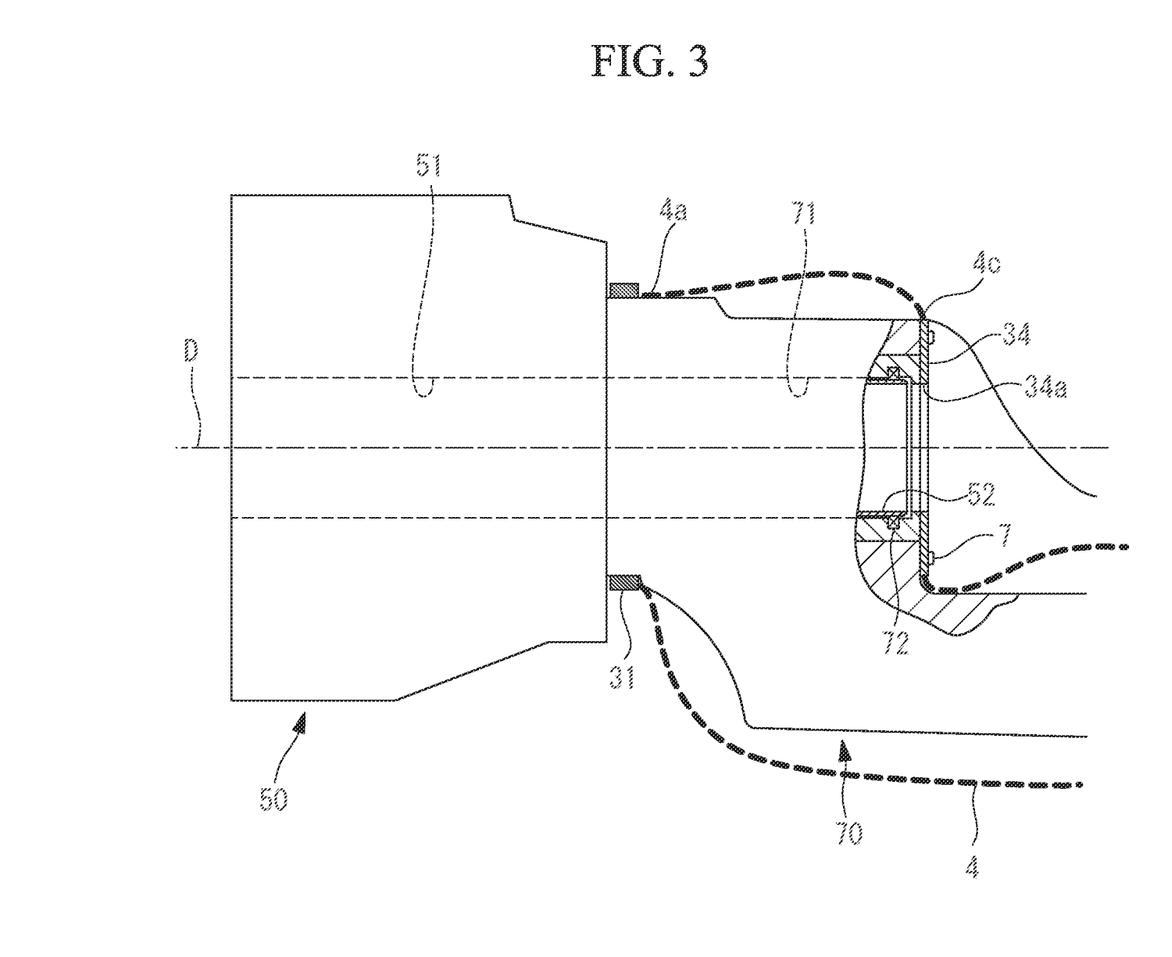
FIG. 3 is an enlarged longitudinal sectional view of a second arm and a first wrist element of the wrist of the robot illustrated in FIG. 1.

As illustrated in FIG. 3, the second arm 50 and the first wrist element 70 have a hollow hole 51 and a hollow hole (first hollow hole) 71 that extend along the J4 axis D. A ring-shaped gap between the second arm 50 and the first wrist element 70 is sealed with an oil seal (not illustrated).

In the hollow holes 51 and 71, a cylindrical guide tube (cylindrical member) 52 fixed to the second arm 50 is disposed along the J4 axis D. A ring-shaped gap between the tip of the guide tube 52 and the first wrist element 70 is sealed with an oil seal 72.

The second wrist element 80 has a hollow hole (second hollow hole) 81 having the J6 axis F as the center axis. The third wrist element 90 has a hollow hole (third hollow hole)

91 having the J6 axis F as the center axis. The third wrist element 90 is disposed in the hollow hole 81 of the second wrist element 80, and a ring-shaped gap between the second wrist element 80 and the third wrist element 90 is sealed with an oil seal (not illustrated). The third wrist element 90 also has a flange surface 90a to which a tool (not illustrated) can be attached, and a cylindrical outer peripheral surface (outer surface) 92 disposed around the flange surface 90a and having the J6 axis F as the center axis.

Figure 4:
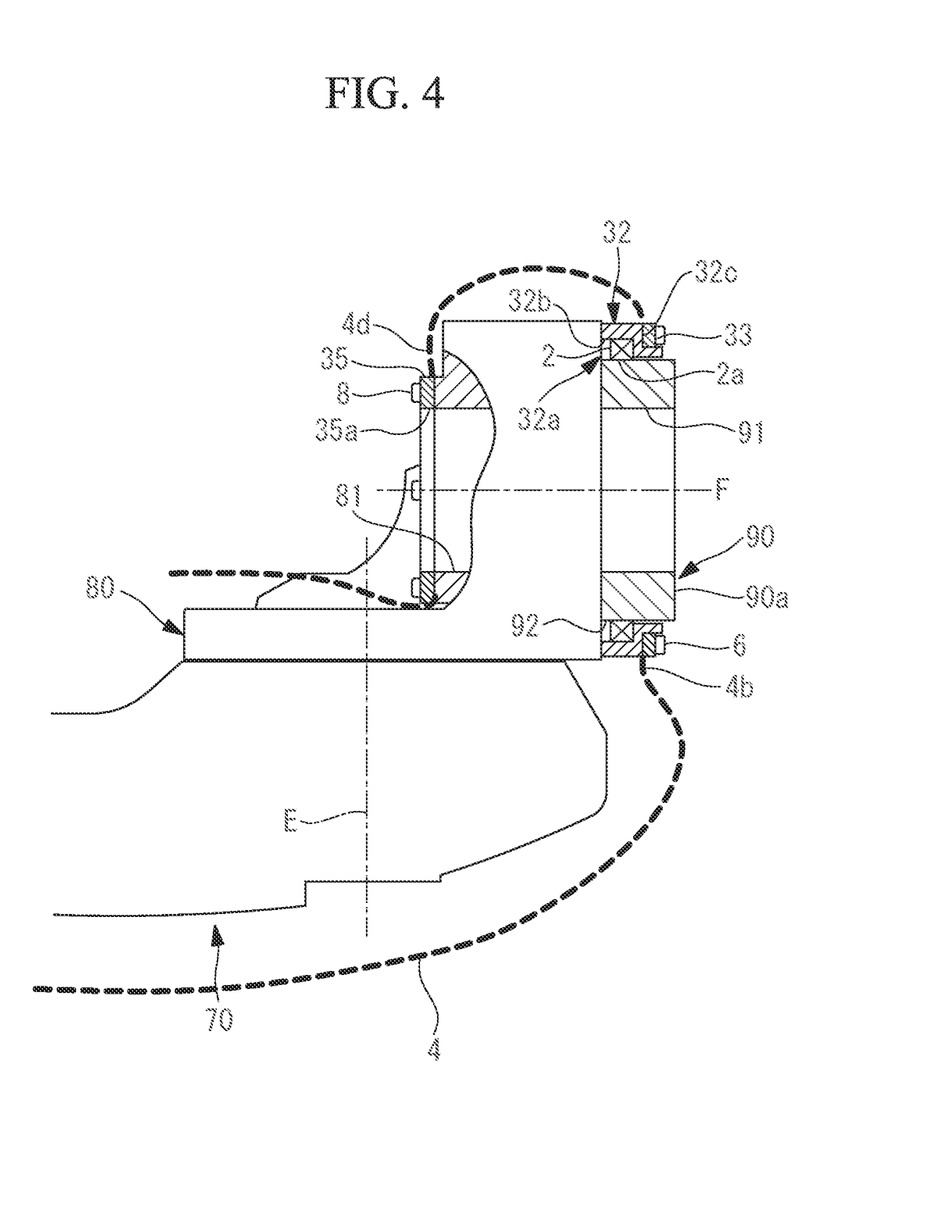
FIG. 4 is an enlarged longitudinal sectional view of a second wrist element and a third wrist element of the wrist illustrated in FIG. 2.

As illustrated in FIGS. 2 to 4, the wrist cover 1 of this embodiment includes an oil seal (first rotating seal member) 2 that seals a ring-shaped gap between the second wrist element 80 and the third wrist element 90 while allowing relative rotation between the second wrist element 80 and the third wrist element 90. Furthermore, the wrist cover 1 includes a bag-shaped cover body 4 that covers the first wrist element 70 and the second wrist element 80, and an attachment member 3 that attaches the cover body 4 to the wrist 60.

The cover body 4 is, for example, formed by a resin having flexibility, preferably, a resin having stretchability. As illustrated in FIG. 2, for example, the cover body 4 is shaped such that the cover body 4 covers the wrist 60 having the J4 axis D and the J6 axis F arranged in a straight line, with a minute gap between the cover 4 and the outer surface of the wrist 60.

Figure 5:
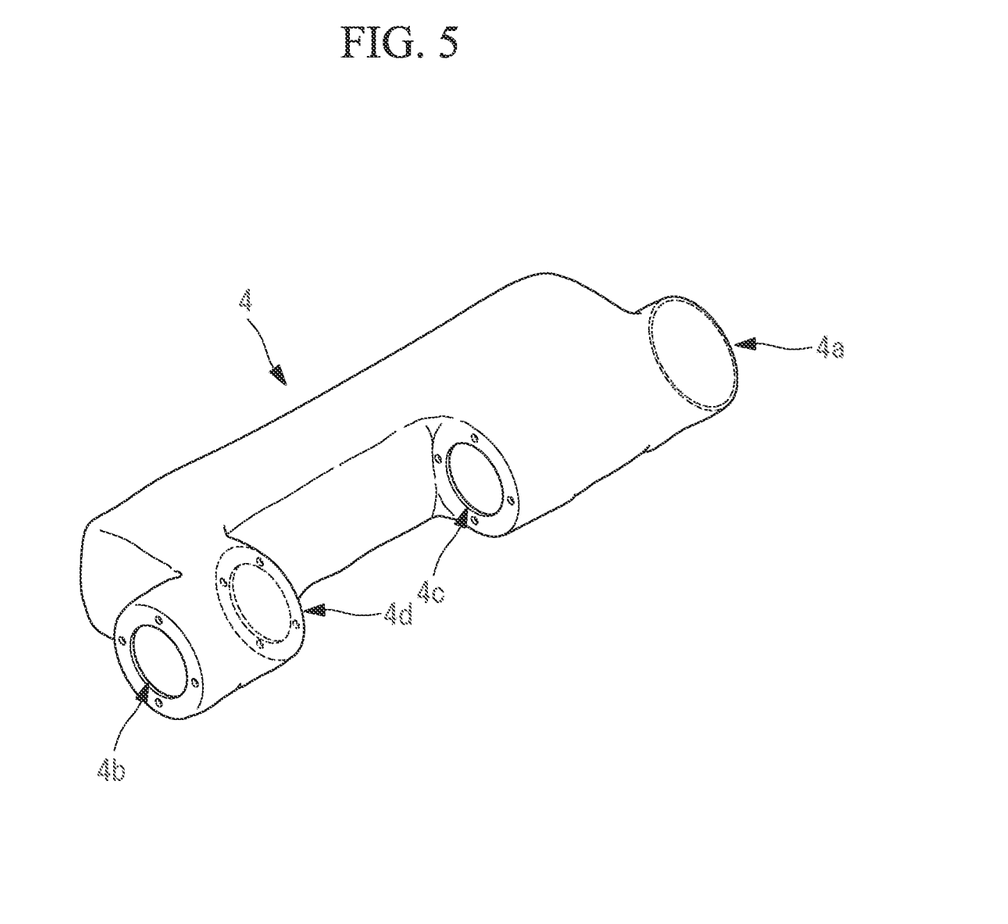
FIG. 5 is a perspective view of a cover body of a wrist cover according to one embodiment of the present disclosure.

As illustrated in FIG. 5, the cover body 4 has a first opening 4a that allows the first wrist element 70 to pass therethrough, and a second opening 4b that allows the third wrist element 90 to pass therethrough. Furthermore, the cover body 4 has a third opening 4c at a position that aligns with the tip-side opening of the hollow hole 71 of the first wrist element 70, and a fourth opening 4d at a position that aligns with the base-side opening of the hollow hole 81 of the second wrist element 80.

As illustrated in FIGS. 3 and 4, the attachment member 3 includes a belt 31 that fixes a peripheral edge of the first opening 4a of the cover body 4 to the first wrist element 70, and an annular member (first annular member) 32 and a press plate 33 that fix a peripheral edge of the second opening 4b to the second wrist element 80. Furthermore, the attachment member 3 includes a ring member 34 that fixes a peripheral edge of the third opening 4c to a peripheral edge of the tip-side opening of the hollow hole 71 of the first wrist element 70, and a ring member 35 that fixes a peripheral edge of the fourth opening 4d to a peripheral edge of the base-side opening of the hollow hole 81 of the second wrist element 80.

In a state in which the first wrist element 70 is passed through the first opening 4a, the belt 31 squeezes the peripheral edge of the first opening 4a of the cover body 4 from the radially outer side. In this manner, the belt 31 fixes the cover body 4 to the first wrist element 70 with the space between the peripheral edge of the first opening 4a of the cover body 4 and the outer peripheral surface of the first wrist element 70 being sealed over the entire periphery thereof.

The annular member 32 has a circular hole (first hole) 32a having an inner diameter larger than the outer diameter of the outer peripheral surface 92 of the third wrist element 90. The annular member 32 can be attached to the tip of the second wrist element 80 by fitting the oil seal 2 into the hole 32a and inserting the outer peripheral surface 92 of the third wrist element 90 into a lip 2a of the oil seal 2.

In other words, an inner peripheral surface (inner surface) 32b of the hole 32a of the annular member 32 has the J6 axis F as the center axis and is arranged to have a gap on the radially outer side with respect to the outer peripheral surface 92 of the third wrist element 90. As a result, the oil seal 2 seals a ring-shaped gap between the inner peripheral surface 32b of the annular member 32 and the outer peripheral surface 92 of the third wrist element 90 while allowing rotation of the third wrist element 90 about the J6 axis F with respect to the second wrist element 80.

The annular member 32 has a ring-shaped mounting surface 32c formed of a flat surface orthogonal to the J6 axis F when attached to the second wrist element 80. The second opening 4b of the cover body 4 can be fixed to the tip of the second wrist element 80 by bringing the peripheral edge of the second opening 4b of the cover body 4 into close contact with the mounting surface 32c, interposing the cover body 4 between the ring-plate-shaped press plate 33 and the mounting surface 32c, and co-fastening these with bolts 6.

As a result, the cover body 4 and the oil seal 2 are attached while the space between the peripheral edge of the second opening 4b and the oil seal 2 is sealed over the entire periphery thereof with the annular member 32 therebetween.

The ring member 34 is formed into a ring plate shape having a through hole 34a having an inner diameter substantially equal to the inner diameter of the hollow hole 71.

The ring member 34 is attached by using multiple bolts 7 while the through hole 34a is aligned with the tip-side opening of the hollow hole 71 so that the peripheral edge of the third opening 4c of the cover body 4 interposed therebetween is attached to the first wrist element 70 in a sealed state.

Similarly, the ring member 35 is formed into a ring plate shape having a through hole 35a having an inner diameter substantially equal to the inner diameter of the hollow hole 81. The ring member 35 is attached by using bolts 8 while the through hole 35a is aligned with the base-side opening of the hollow hole 81 so that the peripheral edge of the fourth opening 4d of the cover body 4 interposed therebetween is attached to the second wrist element 80 in a sealed state.

The operation of the wrist cover 1 and the robot 10 according to this embodiment having such features will now be described.

In order to attach the wrist cover 1 to the wrist 60 of the robot 10, first, as illustrated in FIG. 4, the annular member 32 having the oil seal 2 fitted into the inner peripheral surface 32b is attached to the tip of the second wrist element 80. As a result, the lip 2a of the oil seal 2 comes into close contact with the outer peripheral surface 92 of the third wrist element 90 over the entire periphery thereof, and the oil seal 2 seals the ring-shaped gap between the inner peripheral surface 32b of the annular member 32 and the outer peripheral surface 92 of the third wrist element 90.

Next, the tip of the third wrist element 90 is inserted into the first opening 4a of the cover body 4, and the cover body 4 is spread over the entire wrist 60 as illustrated in FIG. 2. Next, the first wrist element 70 is passed through the first opening 4a, the third wrist element 90 is passed through the second opening 4b, the third opening 4c is aligned with the tip-side opening of the hollow hole 71 of the first wrist element 70, and the fourth opening 4d is aligned with the base-side opening of the hollow hole 81 of the second wrist element 80.

In this state, as illustrated in FIG. 3, the peripheral edge of the first opening 4a with the first wrist element 70 passing therethrough is squeezed from the radially outer side with the belt 31. In this manner, the space between the peripheral edge of the first opening 4a and the outer peripheral surface of the first wrist element 70 can be sealed over the entire periphery thereof, and the cover body 4 can be fixed to the first wrist element 70.

As illustrated in FIG. 4, while the peripheral edge of the second opening 4b of the cover body 4 is interposed between the mounting surface 32c of the annular member 32 and the press plate 33 over the entire periphery thereof, the annular member 32 and the press plate 33 are co-fastened to the second wrist element 80 with the bolts 6. In this manner, the space between the peripheral edge of the second opening 4b and the annular member 32 can be sealed over the entire periphery thereof, and the cover body 4 can be fixed to the second wrist element 80.

Furthermore, the peripheral edge of the tip-side opening of the hollow hole 71 of the first wrist element 70 and the ring member 34 are attached with the bolts 7 while the peripheral edge of the third opening 4c of the cover body 4 is interposed therebetween over the entire periphery thereof. In this manner, the peripheral edge of the third opening 4c is attached and sealed to the peripheral edge of the tip-side opening of the hollow hole 71 of the first wrist element 70. Similarly, by attaching the peripheral edge of the base-side opening of the hollow hole 81 and the ring member 35 with the bolts 8 while the peripheral edge of the fourth opening 4d is interposed therebetween over the entire periphery thereof, the peripheral edge of the fourth opening 4d is attached and sealed to the peripheral edge of the base-side opening of the hollow hole 81. This completes the operation of attaching the wrist cover 1.

Since the cover body 4 surrounds the first wrist element 70 and the second wrist element 80, rotating the second wrist element 80 about the J5 axis E with respect to the first wrist element 70 deforms the cover body 4, and the first wrist element 70 and the second wrist element 80 remain covered.

Since the gap between the second wrist element 80 and the third wrist element 90 is sealed with the oil seal 2, the cover body 4 does not have to be deformed when the third wrist element 90 is rotated about the J6 axis F with respect to the second wrist element 80. In other words, since it is sufficient for the cover body 4 to allow only the deformation caused by rotation of the second wrist element 80 with respect to the first wrist element 70, the margin for deformation assigned to the cover body 4 can be decreased.

For example, when the margin for deformation of the cover body 4 is to be afforded by the stretchability of the cover body 4, the cover body 4 may be designed to have a size that fits the outer surface of the wrist 60. Alternatively, for example, when the margin for deformation of the cover body 4 is to be afforded by the bellows or deflection, a relatively small margin that allows deformation along one axis is sufficient, and there is an advantage in that the wrist cover 1 does not prominently project outward from the wrist 60.

Furthermore, in a state where the hollow holes 71, 81, and 91 are arranged on the outer side of the cover body 4, the cover body 4 surrounds and seals the gap between the first wrist element 70 and the second wrist element 80. Thus, even when dust and the like from the outside have entered the hollow holes 71, 81, and 91, dust and the like are prevented from entering the cover body 4. Thus, even when the wrist 60 has hollow holes, the gap between the first wrist element 70 and the second wrist element 80 can be more reliably protected.

Figure 6:
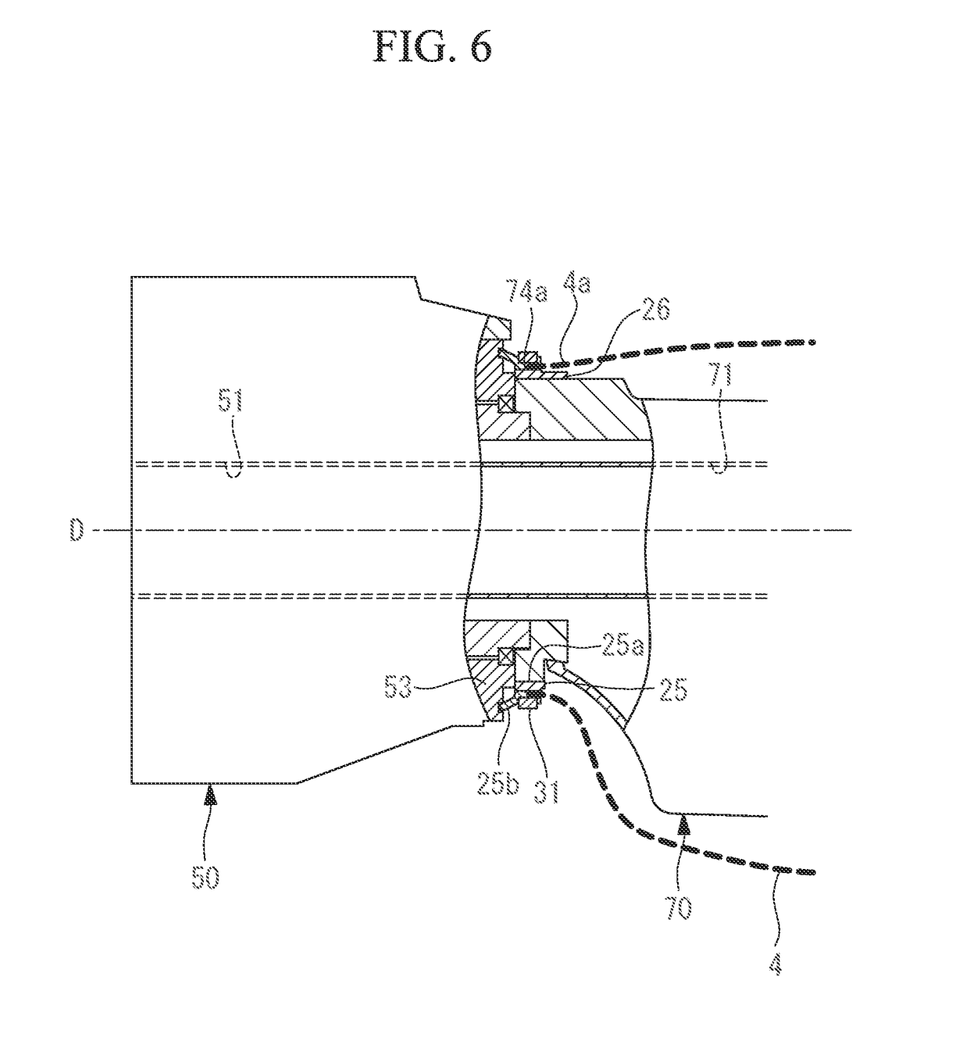
FIG. 6 is an enlarged longitudinal sectional view of a second arm and a first wrist element of a wrist according to a first modified example of the robot illustrated in FIG. 1.

In this embodiment, as illustrated in FIG. 6, the wrist cover 1 may have a seal member (fourth rotating seal member) 25 that seals a ring-shaped gap between the second arm 50 and the first wrist element 70.

In the example illustrated in FIG. 6, the seal member 25 is a strip-shaped member formed of a material capable of undergoing elastic deformation. The seal member 25 includes a body 25a wound over the entire periphery of the outer peripheral surface of a ring-shaped base member 26 fixed to the outer peripheral surface of the first wrist element 70, and a lip 25b that extends from the body 25a in the axial direction and comes into close contact with the annular member 53, which is fixed to the second arm 50, over the entire periphery thereof.

The peripheral edge of the first opening 4a of the cover body 4 is interposed between the base member 26 and the body 25a. Then the belt 31 squeezes the peripheral edge of the first opening 4a from the radially outer side of the body 25a. In this manner, the cover body 4 can be fixed with a space between the peripheral edge of the first opening 4a and the first wrist element 70 being sealed over the entire periphery thereof, and the ring-shaped gap between the second arm 50 and the first wrist element 70 can be sealed with the seal member 25.

Furthermore, in this embodiment, while the peripheral edge of the second opening 4b of the cover body 4 is interposed between the mounting surface 32c of the annular member 32 and the press plate 33 over the entire periphery thereof, the annular member 32 and the press plate 33 are co-fastened to the second wrist element 80 with the bolts 6. Furthermore, while the peripheral edge of the third opening 4c of the cover body 4 is interposed between the peripheral edge of the opening of the hollow hole 71 and the ring member 34 over the entire periphery thereof, these parts are attached by using the bolts 7. Furthermore, the peripheral edge of the opening of the hollow hole 81 and the ring member 35 are attached with the bolts 8 while the peripheral edge of the fourth opening 4d of the cover body 4 is interposed therebetween over the entire periphery thereof. Alternatively, the press plate 33, the ring members 34 and 35 may be attached to the cover body 4 with an adhesive or the like.

Figure 7:
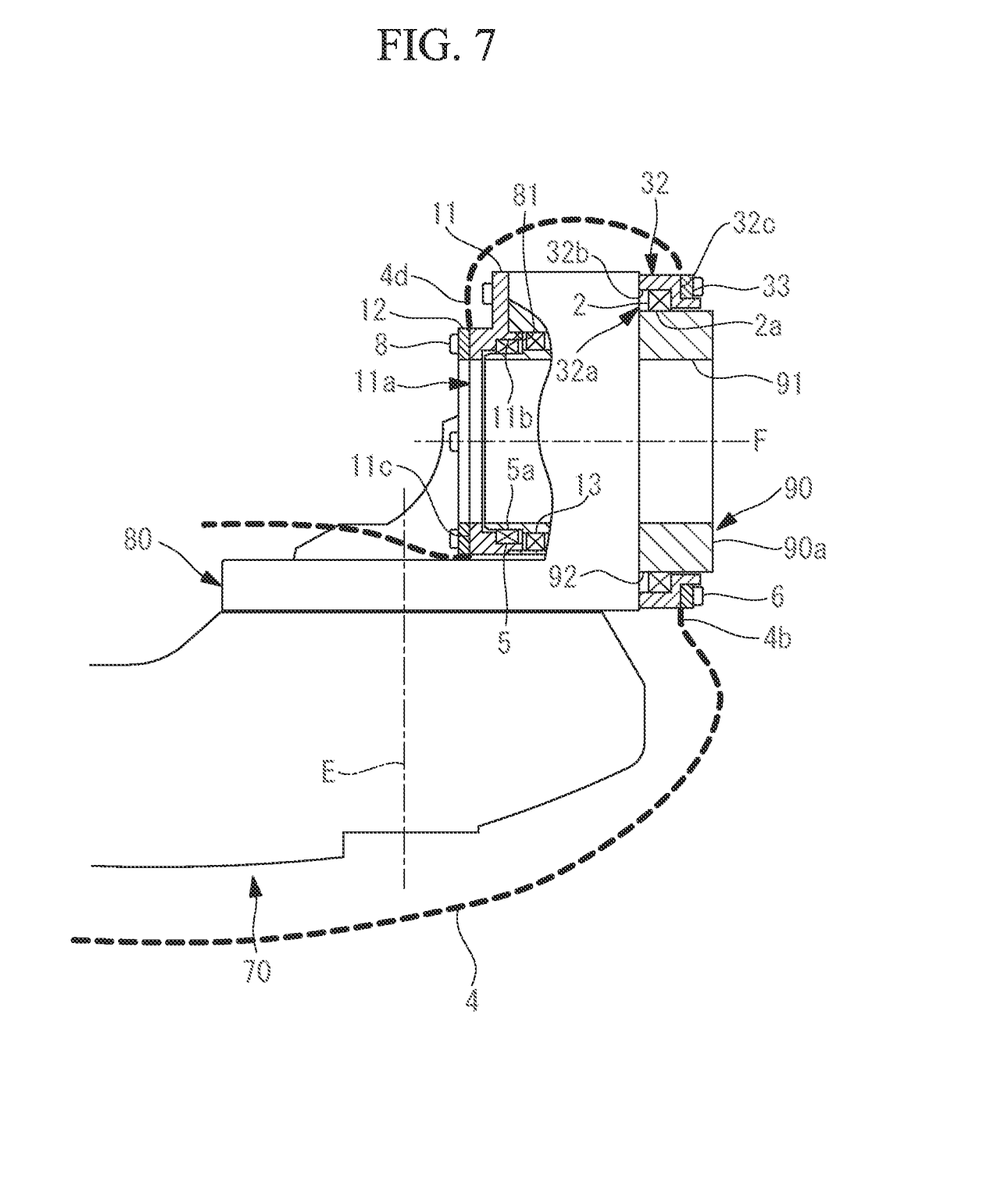
FIG. 7 is an enlarged longitudinal sectional view of a second wrist element and a third wrist element according to a second modified example of the robot illustrated in FIG. 1.

In the present embodiment, the ring-shaped gap between the second wrist element 80 and the third wrist element 90 is sealed with the oil seal 2 on the tip side of the second wrist element 80. In addition, as illustrated in FIG. 7, when the third wrist element 90 passes through the hollow hole 81 of the second wrist element 80 and projects toward the base side also, a ring-shaped gap between the second wrist element 80 and the third wrist element 90 may be sealed with an oil seal (second rotating seal member) 5 on the base side of the second wrist element 80 also.

Specifically, an annular member (second annular member) 11 is fixed to the second wrist element 80 at the peripheral edge of the base-side opening of the hollow hole 81, and the third wrist element 90 projecting toward the base side of the second wrist element 80 is inserted into a hole (second hole) 11a of the annular member 11. An oil seal 5 is attached to the inner peripheral surface (inner surface) 11b of the hole 11a of the annular member 11. By allowing a lip 5a of the oil seal 5 to make contact with the outer peripheral surface 92 of the third wrist element 90, the ring-shaped gap between the third wrist element 90 and the annular member 11 is sealed with the oil seal 5.

In such a case, since the peripheral edge of the fourth opening 4d is interposed between a mounting surface 11c of the annular member 11 and a press plate 12 over the entire periphery thereof, the cover body 4 is fixed to the second wrist element 80 in a sealed state with the annular member 11 therebetween. The ring-shaped gap between the second wrist element 80 and the third wrist element 90 is sealed with an oil seal 13 included in a machine unit of the robot 10; however, on the outer side thereof, the gap between the third wrist element 90 and the annular member 11 is double-sealed with the oil seal 5. As a result, the sealing performance is improved, and the oil seal 13 of the machine unit can be protected from wear.

In the robot 10 of this embodiment, a ring-shaped gap between the first wrist element 70 and the guide tube 52 is sealed with an oil seal 72 on the tip side of the hollow hole 71. In addition, as illustrated in FIG. 8, the wrist cover 1 may include an oil seal (third rotating seal member) 73 that seals a ring-shaped gap between the first wrist element 70 and the guide tube 52.

Figure 8:
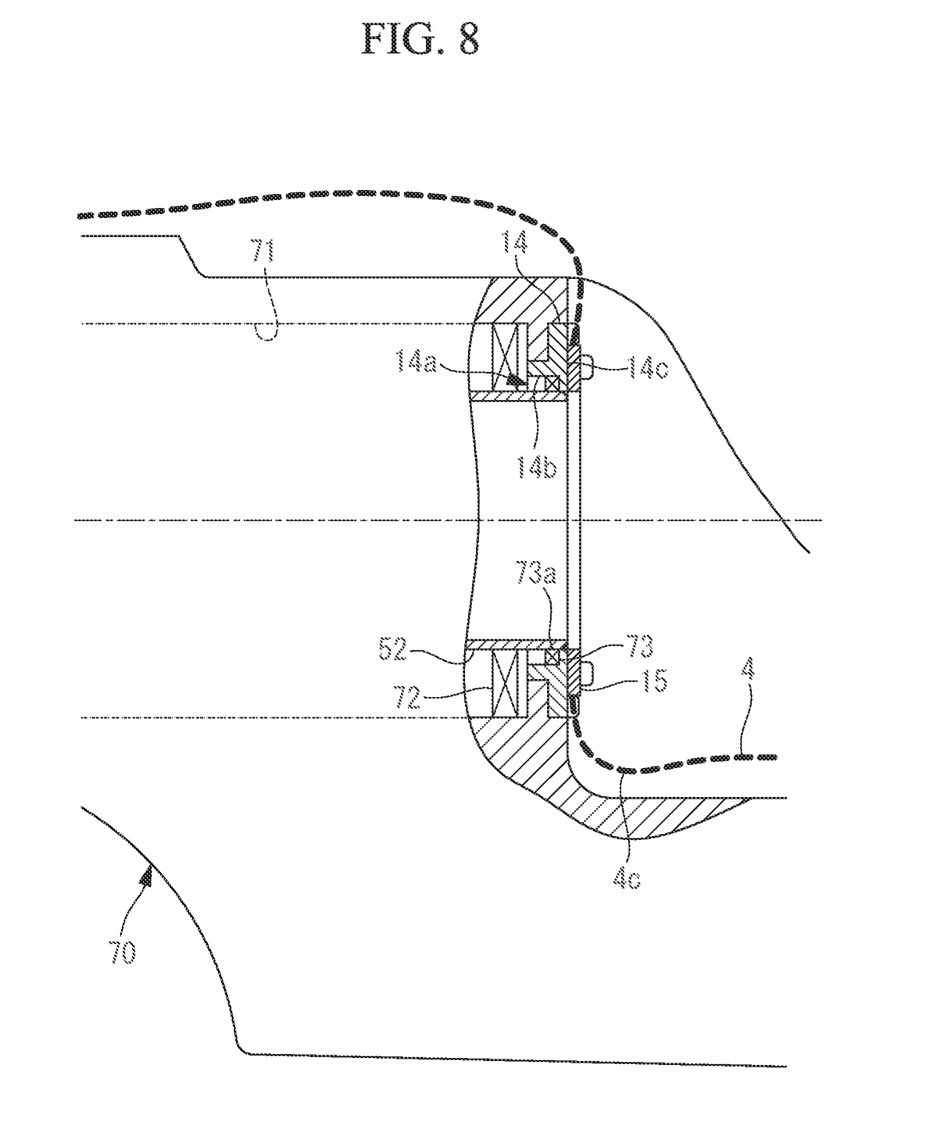
FIG. 8 is an enlarged longitudinal sectional view of a first wrist element according to a third modified example of the robot illustrated in FIG. 1.

In the example illustrated in FIG. 8, at the peripheral edge of the tip-side opening of the hollow hole 71, the wrist cover 1 includes an annular member (third annular member) 14 fixed to the first wrist element 70, and an oil seal 73 attached to an inner peripheral surface (inner surface) 14b of a hole (third hole) 14a of the annular member 14. By allowing the lip 73a of the oil seal 73 to make contact with an outer peripheral surface of the guide tube 52, the ring-shaped gap between the guide tube 52 and the annular member 14 is sealed with the oil seal 73.

Furthermore, since the peripheral edge of the third opening 4c is interposed between a mounting surface 14c of the annular member 14 and a press plate 15 over the entire periphery thereof, the cover body 4 is fixed to the first wrist element 70 in a sealed state with the annular member 14 therebetween. In this manner, the oil seal 72 that seals the ring-shaped gap between the first wrist element 70 and the guide tube 52 serving as the constituent members of the robot 10 is protected by the oil seal 73 disposed between the guide tube 52 and the annular member 14.

In this embodiment, the oil seal 2 is fitted into the inner peripheral surface 32b of the annular member 32. Alternatively, a wrist cover set that includes a cover body 4 with which a peripheral edge of the second opening 4b is fixed to the outer peripheral surface of the second wrist element 80 in a sealed state, and an oil seal 2 may be employed.

In other words, an oil seal 2 that seals the ring-shaped gap between the second wrist element 80 and the third wrist element 90 may be provided separate from the cover body 4 that covers the first wrist element 70 and the second wrist element 80. Furthermore, an oil seal 5 may be included.

In such a case, the lips 2a and 5a of the oil seals 2 and 5 may be in close contact with the outer peripheral surface 92 of the third wrist element 90, or may be in close contact with the inner peripheral surface 81 of the second wrist element 80 or the inner peripheral surfaces 32b and 11b of the annular members 32 and 11 fixed to the second wrist element 80.

Furthermore, in this embodiment, a wrist cover set that includes an oil seal 73 that seals the ring-shaped gap between the first wrist element 70 and the guide tube 52 separate from the cover body 4 that covers the first wrist element 70 and the second wrist element 80 may be employed.

In such a case, the lip 73a of the oil seal 73 may be in close contact with the outer peripheral surface of the guide tube 52, or may be in close contact with the inner peripheral surface of the first wrist element 70 or the inner peripheral surface 14b of the annular member 14 fixed to the first wrist element 70.

The third opening 4c and the fourth opening 4d of the cover body 4 may be omitted. In this manner, the cover body 4 is attached to the wrist 60 through the first opening 4a and the second opening 4b, and thus the attaching operation can be simplified.

REFERENCE SIGNS LIST

1 wrist cover
2 oil seal (first rotating seal member)
4 cover body
4a first opening
4b second opening
4c third opening
4d fourth opening
5 oil seal (second rotating seal member)
10 robot
11 annular member (second annular member)
11a hole (second hole)
11b inner peripheral surface (inner surface)
14 annular member (third annular member)
14a hole (third hole)
14b inner peripheral surface (inner surface)
25 seal member (fourth rotating seal member)
32 annular member (first annular member)
32a hole (first hole)
32b inner peripheral surface (inner surface)
50 second arm (arm)
52 guide tube (cylindrical member)
60 wrist
70 first wrist element
71 hollow hole (first hollow hole)
73 oil seal (third rotating seal member)
80 second wrist element
81 hollow hole (second hollow hole)
90 third wrist element
91 hollow hole (third hollow hole)
92 outer peripheral surface (outer surface)
D J4 axis (first axis)
F J6 axis (third axis)

The invention claimed is:

1. A wrist cover that covers a wrist of a robot, the wrist having a base end and a tip end and including a first wrist element, a second wrist element, and a third wrist element coupled in series from the base end to the tip end so as to be rotatable with respect to one another, the wrist cover comprising:
a first rotating seal member that is fixed to the second wrist element, thereby sealing a ring-shaped gap between the second wrist element and the third wrist element while allowing relative rotation between the second wrist element and the third wrist element; and
a flexible cover body that has a first opening arranged in a state in which the first wrist element is passed therethrough, and a second opening arranged in a state in which the third wrist element is passed therethrough,
wherein the cover body and the first rotating seal member are attached with a space between a peripheral edge of the second opening and the first rotating seal member being sealed over an entire periphery thereof,
at a position that includes a first axis, which is a rotation axis of the first wrist element, the first wrist element has a first hollow hole that extends in a direction of the first axis,
at a position that includes a third axis, which is a rotation axis of the third wrist element, the second wrist element has a second hollow hole that extends in a direction of the third axis, the third wrist element is disposed in the second hollow hole, and, at a position that includes the third axis, the third wrist element has a third hollow hole that extends in the direction of the third axis, the cover body has a third opening disposed at a position aligned with an opening provided closer to the tip end in the first hollow hole and a fourth opening disposed at a position aligned with an opening provided closer to the base end in the second hollow hole, a peripheral edge of the third opening and a peripheral edge of the opening provided closer to the tip end in the first hollow hole are attached in a sealed state, and a peripheral edge of the fourth opening and a peripheral edge of the opening provided closer to the base end in the second hollow hole are attached in a sealed state.

2. The wrist cover according to claim 1, wherein the third wrist element has a cylindrical outer surface, the wrist cover further comprises a first annular member that has a first hole through which the third wrist element is passed and that is fixed to the second wrist element, the first rotating seal member seals a ring-shaped gap between an inner surface of the first hole and the outer surface of the third wrist element while allowing relative rotation between the first annular member and the third wrist element, and the first annular member and the cover body are attached in a state in which the first hole is aligned with the second opening and a peripheral edge of the first hole and the peripheral edge of the second opening are sealed over an entire periphery thereof.

3. The wrist cover according to claim 1, wherein the third wrist element passes through the second hollow hole and projects toward the base end also, the wrist cover further comprises:

a second annular member that has a second hole through which the third wrist element projecting toward the base end is passed and that is fixed to the second wrist element; and a second rotating seal member that seals a ring-shaped gap between an inner surface of the second hole and an outer surface of the third wrist element while allowing relative rotation between the second annular member and the third wrist element, and the second annular member and the cover body are attached in a state in which the second hole is aligned with the fourth opening and a peripheral edge of the second hole and the peripheral edge of the fourth opening are sealed over an entire periphery thereof.

4. The wrist cover according to claim 1, further comprising:

a third annular member that has a third hole that allows a cylindrical member extending along the first axis to pass through the first hollow hole, and that is fixed to the first wrist element; and a third rotating seal member that seals a ring-shaped gap between an inner surface of the third hole and an outer surface of the cylindrical member while allowing relative rotation between the third annular member and the cylindrical member, wherein the third annular member and the cover body are attached in a state in which the third hole is aligned with the third opening and a peripheral edge of the third hole and the peripheral edge of the third opening are sealed over an entire periphery thereof.

5. The wrist cover according to claim 1, further comprising:

a fourth rotating seal member that is fixed to the first wrist element and that seals a ring-shaped gap between an arm that rotatably supports the first wrist element and the first wrist element while allowing relative rotation between the arm and the first wrist element, wherein the cover body and the fourth rotating seal member are attached in a state in which a space between a peripheral edge of the first opening and the fourth rotating seal member is sealed over an entire periphery thereof.

6. A robot comprising the wrist cover according to claim 1.

7. A wrist cover set that covers a wrist of a robot, the wrist having a base end and a tip end and including a first wrist element, a second wrist element, and a third wrist element coupled in series from the base end to the tip end so as to be rotatable with respect to one another, the wrist cover set comprising:

a first rotating seal member that seals a ring-shaped gap between the second wrist element and the third wrist element while allowing relative rotation between the second wrist element and the third wrist element; and a flexible cover body that has a first opening arranged in a state in which the first wrist element is passed therethrough, and a second opening arranged in a state in which the third wrist element is passed therethrough, wherein the cover body is fixed to an outer peripheral surface of the second wrist element in a state in which a peripheral edge of the second opening is sealed over an entire periphery thereof, at a position that includes a first axis, which is a rotation axis of the first wrist element, the first wrist element has a first hollow hole that extends in a direction of the first axis, at a position that includes a third axis, which is a rotation axis of the third wrist element, the second wrist element has a second hollow hole that extends in a direction of the third axis, the third wrist element is disposed in the second hollow hole, and, at a position that includes the third axis, the third wrist element has a third hollow hole that extends in the direction of the third axis, the cover body has a third opening disposed at a position aligned with an opening provided closer to the tip end in the first hollow hole and a fourth opening disposed at a position aligned with an opening provided closer to the base end in the second hollow hole, a peripheral edge of the third opening and a peripheral edge of the opening provided closer to the tip end in the first hollow hole are attached in a sealed state, and a peripheral edge of the fourth opening and a peripheral edge of the opening provided closer to the base end in the second hollow hole are attached in a sealed state.

* * * * *